United States Patent
Peter et al.

(10) Patent No.: US 10,205,788 B2
(45) Date of Patent: Feb. 12, 2019

(54) RUN-TIME ACTIONABLE INFORMATION EXCHANGE SYSTEM IN A SECURE ENVIRONMENT

(71) Applicants: Henry T. Peter, Mountain House, CA (US); Romolo E. Raffo, Mountain View, CA (US)

(72) Inventors: Henry T. Peter, Mountain House, CA (US); Romolo E. Raffo, Mountain View, CA (US)

(73) Assignee: Dialogic, Inc., Milpitas, CA (US)

( * ) Notice: Subject to any disclaimer, the term of this patent is extended or adjusted under 35 U.S.C. 154(b) by 337 days.

(21) Appl. No.: 13/951,896

(22) Filed: Jul. 26, 2013

(65) Prior Publication Data

US 2014/0032773 A1    Jan. 30, 2014

Related U.S. Application Data

(60) Provisional application No. 61/677,279, filed on Jul. 30, 2012.

(51) Int. Cl.
*H04L 29/08*    (2006.01)
*H04L 29/06*    (2006.01)

(52) U.S. Cl.
CPC ........ *H04L 67/142* (2013.01); *H04L 65/1006* (2013.01); *H04L 65/1036* (2013.01); *H04L 65/1073* (2013.01)

(58) Field of Classification Search
CPC ........ H04L 12/16; H04L 12/56; G06F 15/173
USPC ........................................ 709/228
See application file for complete search history.

(56) References Cited

U.S. PATENT DOCUMENTS

| | | | |
|---|---|---|---|
| 2004/0156380 A1* | 8/2004 | Silverman et al. | 370/428 |
| 2007/0076710 A1* | 4/2007 | Khan | 370/389 |
| 2007/0116043 A1* | 5/2007 | MeLampy et al. | 370/466 |
| 2008/0008202 A1* | 1/2008 | Terrell | H04L 45/00 370/401 |
| 2008/0162720 A1* | 7/2008 | Gulati | H04L 63/20 709/238 |
| 2009/0225744 A1* | 9/2009 | Zerillo | H04L 29/1216 370/352 |
| 2010/0067519 A1* | 3/2010 | Mang et al. | 370/352 |
| 2010/0246447 A1* | 9/2010 | Hoffmann | 370/259 |
| 2011/0113141 A1* | 5/2011 | Veenstra et al. | 709/226 |

* cited by examiner

*Primary Examiner* — Nicholas R Taylor
*Assistant Examiner* — Meng Vang
(74) *Attorney, Agent, or Firm* — BainwoodHuang

(57) ABSTRACT

Systems and methods of implementing features in session border controllers at runtime after deployment. The systems can include a session border controller (SBC), and a user computer communicably coupled to the SBC by a network. The systems and methods can enable a user to introduce, via the user computer, actionable information (AI) into the SBC, which can store the AI in an AI registry. The SBC can expose or otherwise make available the AI stored in the AI registry to the user, allowing the user to generate and/or modify, using at least some of the AI, one or more policies and/or rules that can be implemented and/or executed by the SBC for introducing one or more features in the SBC. In this way, such features can be implemented in the SBC at runtime after deployment, without having to undergo a separate design and development cycle for the SBC.

24 Claims, 10 Drawing Sheets

FIG. 1 – Prior art

```xml
<Policy xsi:noNamespaceSchemaLocation="Policy.xsd" xmlns:xsi="http://www.w3.org/2001/XMLSchema-instance">
  <Id>3</Id>
  <Name>test_policy_2</Name>
  <CfgStatus>Yes</CfgStatus>
  <Rule CfgStatus="Yes" Id="1">
    <Operand>
      <Parameter>CallingPartyUserId</Parameter>   ← Parameter 502
    </Operand>
    <Operator>
      <BeginsWith>
        <StringList>777</StringList>
      </BeginsWith>
    </Operator>
    <Treatment Id="2">                            ← Action 504a
      <Route>
        <Peer>
          <SIP peer="21"/>                        ← Action 504b
        </Peer>
      </Route>
    </Treatment>
  </Rule>
</Policy>
```

AI ➔ {Consumer, Command, Parameter(s)}

Consumer : { Core, Policy, Profiler, Any}
Command : { InvokePolicy, Forward, Reject, UseCNAME, UseDestination,...}
Parameters: { Value (Policy Name / CNAME (String)), Response Code (for rejection),
           Boolean Y/N, Name-Value Pairs ("Dest=IP Address")}

FIG. 7

```xml
<Policy xmlns:xsi="http://www.w3.org/2001/XMLSchema-instance" xsi:noNamespaceSchemaLocation="Policy.xsd">
    <Id>3</Id>
    <Name>test_policy_2</Name>
    <CfgStatus>Yes</CfgStatus>
    <Rule Id="1" CfgStatus="Yes" >
        <Operand>
            <Parameter>CallingPartyUserId</Parameter>   ← Parameter 802
        </Operand>
        <Operator>
            <BeginsWith>
                <StringList>777</StringList>
            </BeginsWith>
        </Operator>
        <Treatment Id="2">
            <Route>
                <Peer><SIP peer="21"/></Peer>
            </Route>
        </Treatment>
        <Treatment Id="3">   ← Action 804a
            <Route>
                <AI_MarkedPriority Value="High">
                    <Peer><SIP peer="22"/></Peer>     ← Action 804b
                </AI_MarkedPriority>
            </Route>
        </Treatment>
        <Treatment Id="4">
            <Route>
                <Peer><SIP peer="23"/></Peer>
            </Route>
        </Treatment>
    </Rule>
</Policy>
```

RUN-TIME ACTIONABLE INFORMATION EXCHANGE SYSTEM IN A SECURE ENVIRONMENT

CROSS-REFERENCE TO RELATED APPLICATIONS

This application claims benefit of the priority of U.S. Provisional Patent Application No. 61/677,279 filed Jul. 30, 2012 entitled RUN-TIME ACTIONABLE INFORMATION EXCHANGE SYSTEM IN A SECURE ENVIRONMENT.

TECHNICAL FIELD

The present application relates generally to session border controllers, and more specifically to systems and methods of implementing features in session border controllers at run-time after deployment.

BACKGROUND

In recent years, session border controllers (SBCs) have been increasingly employed in telecommunications networks not only to provide security at the borders of private networks, but also to handle the switching of interactive multimedia communications sessions (e.g., voice over Internet protocol (VoIP) calls). Such SBCs can employ the Session Initiation Protocol (SIP) for controlling such interactive multimedia communications sessions between a source endpoint device (e.g., a first VoIP-enabled phone, VoIP gateway, or any other suitable VoIP device) and a destination endpoint device (e.g., a second VoIP-enabled phone, VoIP gateway, or any other suitable VoIP device) located in different VoIP networks, or in different portions of the same VoIP network.

FIG. 1 depicts a conventional SBC 100, which can include at least one SIP message profile analyzer/manipulator (also referred to herein as a/the "SIP message profiler"), such as an incoming SIP message profiler 102, and an outgoing SIP message profiler 104. The conventional SBC 100 can further include a session controller core 106, and a policy engine 108. In one mode of operation, the conventional SBC 100 can be deployed at a border between VoIP networks for controlling an interactive multimedia communications session between two parties of a VoIP call. To that end, a first party to the VoIP call can send, from a first VoIP device in a first VoIP network, a SIP request message for subsequent receipt, at a second VoIP device in a second VoIP network, by a second party to the VoIP call. For example, the SIP request message can be a SIP INVITE message for inviting the second party to participate in a session for the VoIP call.

Having been sent from the first VoIP device in the first VoIP network, the SIP request message is received at the incoming SIP message profiler 102 within the conventional SBC 100, which can execute a specified SIP message profiler rule pertaining to the forwarding of the SIP request message. The incoming SIP message profiler 102 then forwards the SIP request message to the session controller core 106, which can access specified information contained in the SIP request message, and provide the specified information to the policy engine 108. Based at least on the information provided to it by the session controller core 106, the policy engine 108 can implement a predetermined policy for subsequent handling of the SIP request message, by the outgoing SIP message profiler 104, to the second VoIP device in the second VoIP network.

Because, in the conventional SBC 100, the incoming and outgoing SIP message profilers 102, 104, as well as the policy engine 108, typically depend on one or more primitives introduced at design and development time for introducing dynamic changes in the operation of the SBC, they are generally incapable of dynamically implementing new features at runtime that span the capabilities of the incoming/outgoing SIP message profilers 102, 104 and the policy engine 108. However, requiring such new features in an SBC to be implemented at design and development time can delay the time-to-market, increase costs, and potentially introduce vulnerabilities and/or instabilities into the SBC.

SUMMARY

In accordance with the present application, systems and methods are disclosed for the implementation of features in session border controllers at runtime after deployment. The disclosed systems and methods can involve a session border controller, and at least one external user computer communicably coupled to the session border controller by at least one network. As employed herein, the term "session border controller" (SBC) refers to a device or collection of functions that can be deployed at a border between different networks, or between different portions of the same network, for controlling the signaling and media streams involved in setting up, conducting, and/or tearing down interactive multimedia communications across the border. For example, such an SBC can be deployed at the border between voice over Internet protocol (VoIP) networks for controlling the signaling and media streams for voice or video calls (also referred to herein as "VoIP calls"). The term "session" is employed herein to refer to interactive multimedia communications between two parties of a VoIP call. Such an SBC can employ a predetermined signaling communications protocol, such as the Session Initiation Protocol (SIP), for controlling an interactive multimedia communications session between the parties of a VoIP call.

In one aspect, an SBC includes one or more SIP message profile analyzers/manipulators, including an incoming SIP message profile analyzer/manipulator (also referred to herein as a/the "incoming SIP message profiler"), and an outgoing SIP message profile analyzer/manipulator (also referred to herein as a/the "outgoing SIP message profiler"). The SBC further includes a session controller core (SCC), a policy engine, an actionable information memory space, and an actionable information registry. The term "actionable information" (AI) is employed herein to refer to information or data including, but not limited to, SIP header profile information, SIP parameter profile information, SIP method profile information, policy rule information, policy parameter information, and/or SBC feature information, at least some of which can be generated by one or more functional components of the SBC (such information or data generated by functional components of the SBC also referred to herein as "system AI"), and/or inputted or otherwise introduced into the SBC by a user (such information or data introduced into the SBC by a user also referred to herein as "user AI"). In an exemplary aspect, the SBC is configured to allow a user, via a user computer or any other suitable computerized device, to interface with at least the incoming SIP message profiler, the outgoing SIP message profiler, and/or the policy engine to enable a user to introduce such user AI into the SBC prior to deployment, and/or at runtime after deployment. In this exemplary aspect, the incoming SIP message profiler, the outgoing SIP message profiler, the SCC, and/or the policy engine can deposit such user AI introduced by the user, as well as such system AI generated by the functional components of the SBC, into the AI memory space to allow any dynamic values associated with the user AI and/or the system AI to be passed, as desired and/or required, between the incoming SIP message profiler, the outgoing SIP message profiler, the SCC, and/or the policy engine. The user AI and the system AI can also be deposited, via the AI memory space, into the AI registry for subsequent registration and storage in one or more AI registry files, or any other suitable data store.

In an exemplary mode of operation, a user can introduce, via a user computer, user AI into the SBC prior to deployment. For example, such user AI can include policy rule information and/or policy parameter information, introduced into the SBC via the policy engine, pertaining to a predetermined policy to be implemented by the policy engine. Such user AI can further include SIP header profile information introduced, via the incoming and/or outgoing SIP message profiler, into the SBC for manipulating, in a specified SIP message profiler rule, an outgoing SIP message profile in accordance with the predetermined policy, as well as SBC feature information introduced, via the incoming and/or outgoing SIP message profiler, into the SBC for marking a session with a predetermined feature tag in response to the execution of the specified SIP message profiler rule. The policy engine and the incoming/outgoing SIP message profiler can each deposit such user AI, including the policy rule information, the policy parameter information, the SIP header profile information, and/or the SBC feature information, into the AI memory space for subsequent deposit, registration, and storage in the AI registry in one or more AI registry files. In an exemplary aspect, the SCC can implement a predetermined AI lookup policy in the AI registry files for subsequent use by the user in accessing the user AI, as well as any system AI, from the AI registry.

With reference to this exemplary mode of operation, the SBC is deployed at a border between VoIP networks for controlling interactive multimedia communications sessions between parties of VoIP calls. At runtime after deployment, the user can interface with, over a network via a graphical user interface (GUI) of the user computer, the incoming SIP message profiler, the outgoing SIP message profiler, and/or the policy engine to access the user AI and/or the system AI stored in the AI registry. Further, the SBC can expose or otherwise make available, to the user via the GUI of the user computer, the user AI and/or the system AI stored in the AI registry in accordance with the AI lookup policy. In this exemplary mode of operation, the user can access, via the GUI of the user computer, a first portion of the user AI, such as the policy rule information and/or the policy parameter information pertaining to the predetermined policy to be implemented by the policy engine, and modify, via the GUI of the user computer, the predetermined policy using the policy rule and/or parameter information. For example, the user may modify the predetermined policy to provide a specific routing treatment for a specified route in a VoIP call, such that the specific routing treatment introduces a new feature in the SBC for handling the VoIP call. The user can also access, via the GUI of the user computer, at least a second portion of the user AI, such as the SIP header profile information and/or the SBC feature information pertaining to the specified SIP message profiler rule to be executed by the incoming/outgoing SIP message profiler, and modify, via the GUI of the user computer, the specified SIP message profiler rule using the SIP header profile and/or SBC feature information.

With further reference to this exemplary mode of operation, a first party to a VoIP call can send, from a first endpoint device (e.g., a first VoIP-enabled phone) within a first VoIP network, a SIP request message for receipt, at a second endpoint device (e.g., a second VoIP-enabled phone) within a second VoIP network, by a second party to the VoIP call. For example, the SIP request message can be a SIP INVITE message for inviting the second party to participate in a session for the VoIP call, or any other suitable SIP request message. The SIP INVITE message is received by the SBC deployed at the border between the first and second VoIP networks, and forwarded by the incoming SIP message profiler to the SCC, which accesses at least routing information contained in the SIP INVITE message. In this exemplary mode of operation, the routing information accessed from the SIP INVITE message is indicative of the specified route in the VoIP call that is subject to specific routing treatment by the predetermined policy previously modified by the user. The SCC provides at least a portion of the routing information to the policy engine, which implements the modified policy based on the specified route indicated in the routing information. For example, in response to the implementation of the modified policy, a priority value for the specified route may be set to a logical high level, or any other suitable level. The SCC then forwards the SIP INVITE message to the outgoing SIP message profiler, which executes the specified SIP message profiler rule, previously modified by the user, based at least on the setting of the priority value for the specified route. In response to the execution of the modified SIP message profiler rule, the outgoing SIP message profiler manipulates the SIP INVITE message to mark the session for the VoIP call with the predetermined feature tag indicative of the specific routing treatment for introducing the new feature in the SBC for the handling of the VoIP call. For example, the outgoing SIP message profiler may add a suitable SIP priority header to the SIP INVITE message. The outgoing SIP message profiler then sends the SIP INVITE message with the SIP priority header over the second VoIP network for receipt at the second endpoint device by the second party to the VoIP call.

By enabling a user to introduce user AI into a session border controller (SBC), storing the user AI and any system AI in an AI registry within the SBC, exposing the user AI and/or the system AI stored in the AI registry to the user, and allowing the user to generate, modify, define, or otherwise influence at least one operational aspect of the SBC using the user AI and/or system AI, one or more features can be advantageously implemented in the SBC at runtime after deployment, without having to undergo a separate design and development cycle for the SBC.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 5 illustrates an exemplary policy that can be implemented by an exemplary policy engine included in the SBC deployed in the network environment of FIG. 2;

FIG. 7 illustrates exemplary actionable information (AI) that can be introduced by a user into the SBC of FIG. 6, and stored in an AI registry included in the SBC of FIG. 6;

FIG. 8 illustrates an exemplary policy that an be implemented by an exemplary policy engine included in the SBC of FIG. 6, the policy being able to be generated or modified by a user using at least some of the AI of FIG. 7;

DETAILED DESCRIPTION

The disclosure of U.S. Provisional Patent Application No. 61/677,279 filed Jul. 30, 2012 entitled RUN-TIME ACTIONABLE INFORMATION EXCHANGE SYSTEM IN A SECURE ENVIRONMENT is hereby incorporated herein by reference in its entirety.

Systems and methods are disclosed for the implementation of features in session border controllers at runtime after deployment. The disclosed systems and methods can involve a session border controller (SBC), and at least one external user computer communicably coupled to the SBC by at least one network. The disclosed systems and methods can enable a user to introduce, via the user computer, actionable information (AI) into the SBC, which can store the AI in an AI registry within the SBC. The SBC can subsequently expose or otherwise make available the AI stored in the AI registry to the user, allowing the user to generate, modify, define, or otherwise influence, using at least some of the AI, at least one operational aspect of the SBC. In this way, one or more features can be advantageously implemented in the SBC at runtime after deployment, without having to undergo a separate design and development cycle for the SBC.

Figure 2:
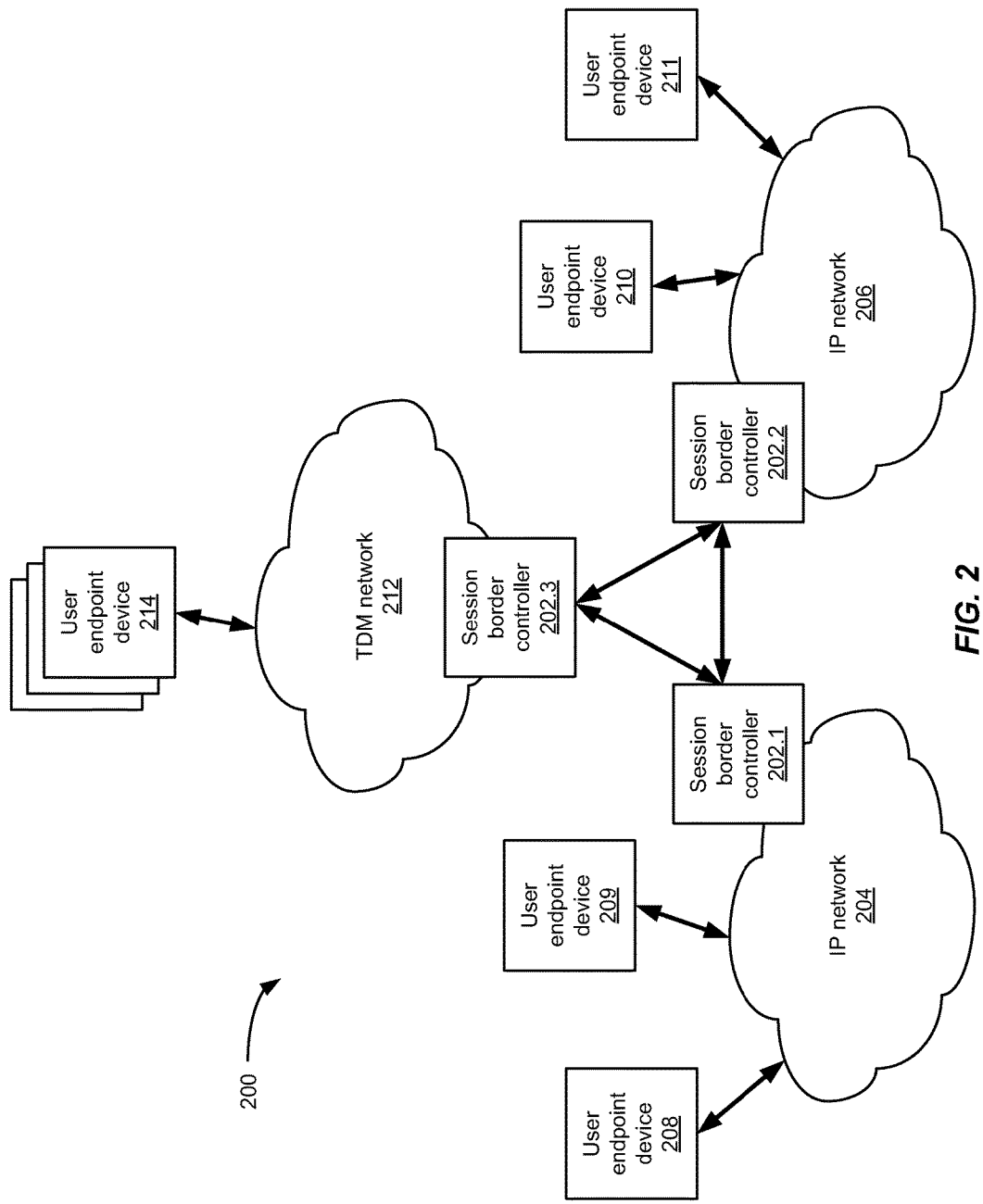
FIG. 2 is a block diagram of an exemplary network environment in which an exemplary SBC can be deployed.

FIG. 2 depicts an exemplary network environment 200 in which one or more exemplary session border controllers (SBC(s)) 202.1, 202.2, 202.3 can be deployed. As shown in FIG. 2, the network environment 200 includes the SBCs 202.1, 202.2 disposed at borders of Internet protocol (IP) networks 204, 206, respectively, and the SBC 202.3 disposed at a border of a time division multiplexed (TDM) network 212. The term "IP network" is employed herein to refer to a network of devices that employ the Internet protocol for their communication protocol. The term "TDM network" is employed herein to refer to a network of devices that communicate using dedicated end-to-end circuits. For example, the IP networks 204, 206 can each be a voice over Internet protocol (VoIP) network, or any other suitable IP network. Further, the TDM network 212 can be the public switched telephone network (PSTN), or any other suitable TDM network. At least one user endpoint device 208, 209, such as at least one VoIP-enabled phone VoIP gateway, or any other suitable VoIP device, can be communicably coupled to the IP network 204, and at least one user endpoint device 210, 211, such as at least one additional VoIP-enabled phone, VoIP gateway, or any other suitable VoIP device, can likewise be communicably coupled to the IP network 206. Further, at least one user endpoint device 214, such as a TDM-enabled phone or any other suitable TDM device, can be communicably coupled to the TDM network 212.

In the network environment 200 of FIG. 2, the SBCs 202.1, 202.2, 202.3 are operative to control the signaling and media streams involved in setting up, conducting, and/or tearing down interactive multimedia communications across the respective borders between the IP networks 204, 206 and the TDM network 212. For example, for interactive multimedia communications involving the user endpoint device 208 or 210 (e.g., a VoIP-enabled phone, VoIP gateway, or any other suitable VoIP device) and the user endpoint device 214 (e.g., a TDM-enabled phone or any other suitable TDM device), the SBC 202.3 can operate as a breakout point to transfer such interactive multimedia communications from a packet switching domain of the IP network 204 or 206, to a circuit switching domain of the TDM network 212.

Moreover, for interactive multimedia communications involving the user endpoint devices 208 and 210 (e.g., two VoIP-enabled phones, VoIP gateways, or any other suitable VoIP devices), the SBCs 202.1, 202.2 can operate to control the signaling and media streams for voice or video calls (also referred to herein as "VoIP calls"). The term "session" is employed herein to refer to such interactive multimedia communications between two parties of a VoIP call. The SBCs 202.1, 202.2 can employ a predetermined signaling communications protocol, such as the Session Initiation Protocol (SIP) or any other suitable protocol, for controlling such an interactive multimedia communications session between the parties of a VoIP call.

In an exemplary mode of operation, the SBC 202.1, which can be embodied as the conventional SBC 100 (see FIG. 1) or any other suitable SBC, can be deployed at the border of the VoIP network 204 (see FIG. 2) for controlling an interactive multimedia communications session between two parties of a VoIP call. To that end, a first party to the VoIP call can send, from a user endpoint device A (e.g., the user endpoint device 208, such as a VoIP-enabled phone, communicably coupled to the IP network 204), a SIP request message for ultimate receipt, at a user endpoint device B (e.g., the user endpoint device 210, such as an additional VoIP-enabled phone, communicably coupled to the IP network 206), by a second party to the VoIP call. For example, the SIP request message can be a SIP INVITE message for inviting the second party to participate in a session for the VoIP call, or any other suitable SIP request message.

Figure 3:
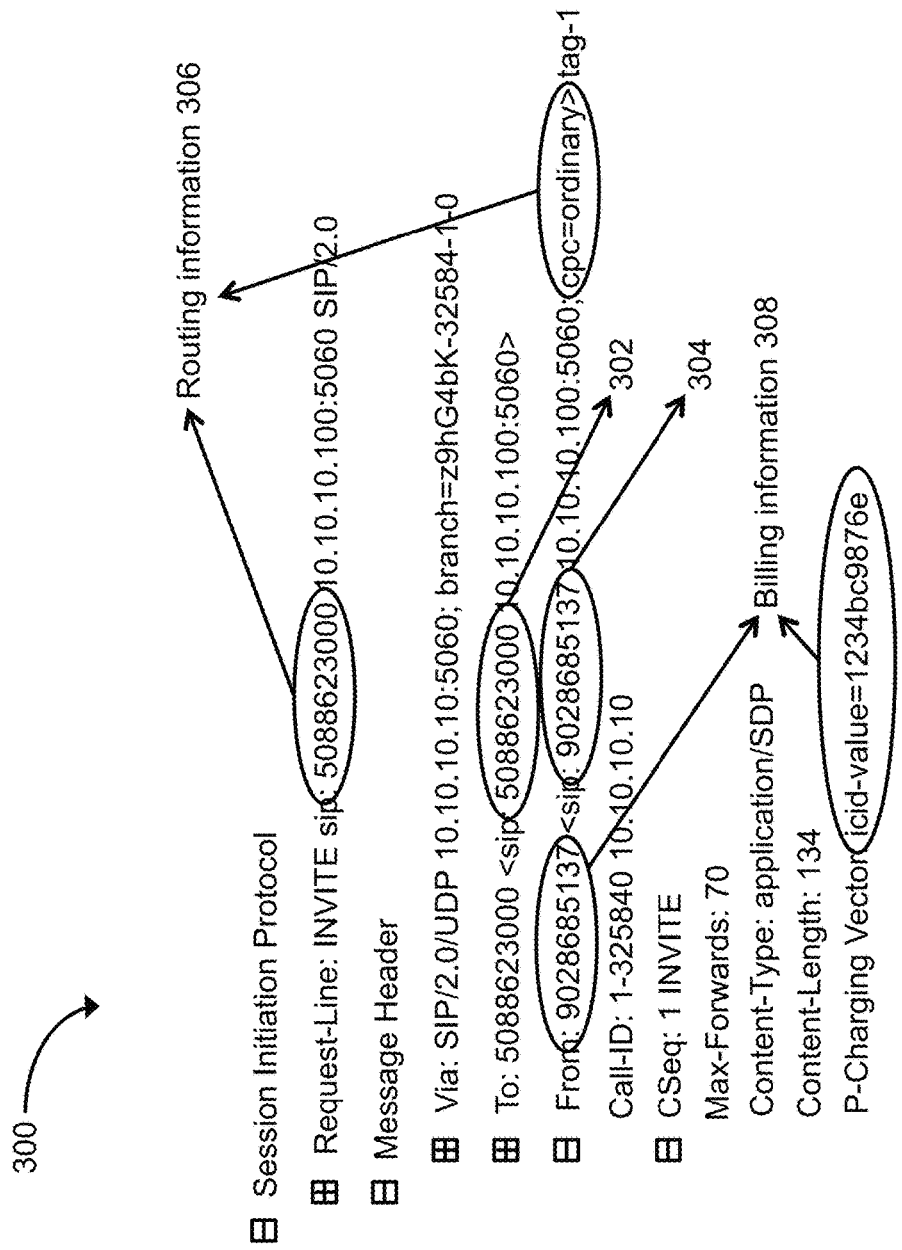
FIG. 3 illustrates an exemplary SIP INVITE message that can be handled by the SBC deployed in the network environment of FIG. 2.

FIG. 3 depicts an exemplary SIP INVITE message 300 that can be sent from the user endpoint device 208 (see FIG. 2), and handled by the conventional SBC 100 (see FIG. 1) prior to forwarding for ultimate receipt at the user endpoint device 210 (see FIG. 2). The SIP INVITE message 300 contains a number of header fields, which are named attributes that provide specific information pertaining to the SIP INVITE message 300. For example, the header fields contained in the SIP INVITE message 300 can include, but are not limited to, a "Request-Line" header field, a "Via" header field, a "To" header field, a "From" header field, and a "CSeq" header field. As shown in FIG. 3, the "To" header field has a value "5088623000" (see reference numeral 302) that indicates the user address (e.g., the phone number) of the user endpoint device 210 (also referred to herein as a/the "destination endpoint device") toward which the SIP INVITE message 300 is directed. Further, the "From" header field has a value "9028685137" (see reference numeral 304) that indicates the user address (e.g., the phone number) of the user endpoint device 208 (also referred to herein as a/the "source endpoint device") from which the SIP INVITE message 300 originated. The "From" header field, as well as the "Request-Line" header field, also include routing information 306 for the SIP INVITE message 300, specifically, "cpc=ordinary" in the "From" header field, and the phone number "5088623000" of the destination endpoint device 210 in the "Request-Line" header field. In addition, the "From" header field, as well as the "CSeq" header field, include billing information 308, specifically, the phone number "9028685137" of the source endpoint device 208 in the "From" header field, and "icid-value=1234bc9876e" in the "P-Charging Vector" header field.

Figure 1:
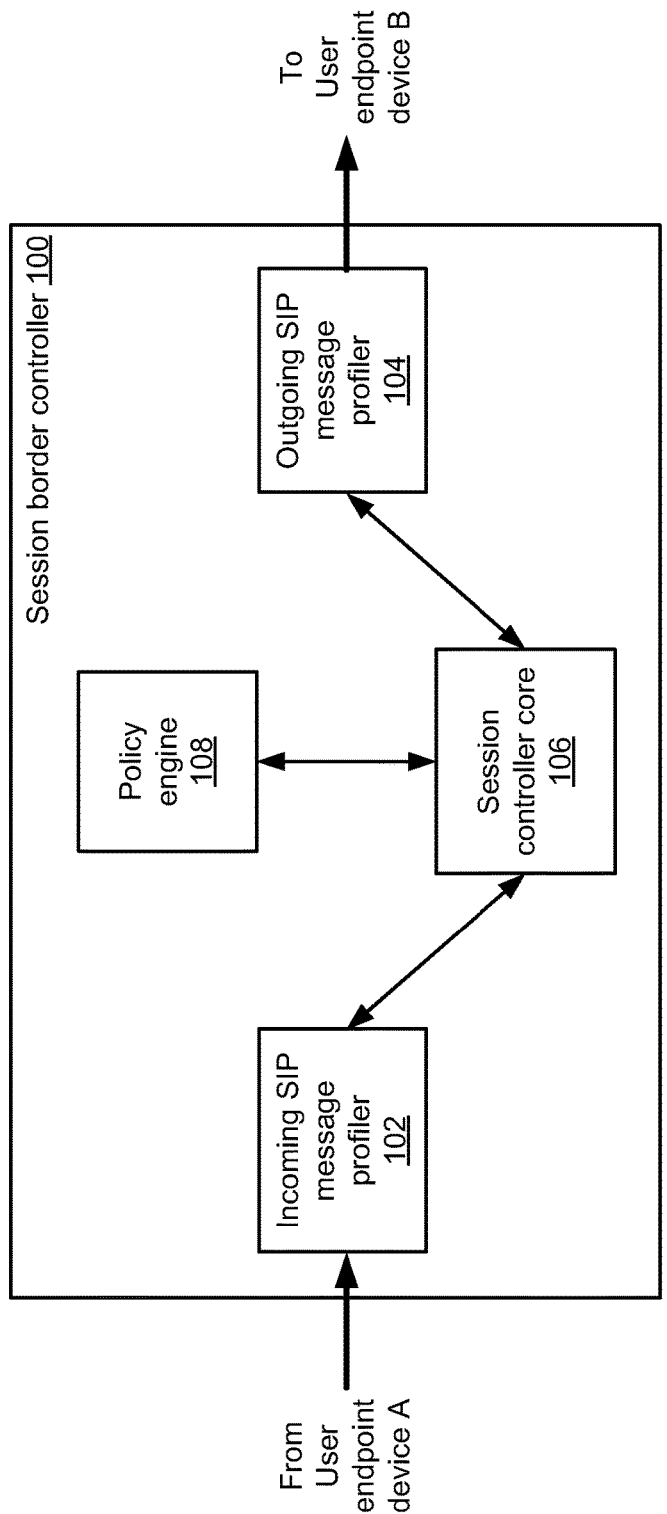
FIG. 1 is a block diagram of an exemplary conventional session border controller (SBC)

Having been sent from the source endpoint device 208 (see FIG. 2), the SIP request message, i.e., the SIP INVITE message 300 (see FIG. 3), is received at the incoming SIP message profiler 102 (see FIG. 1) within the conventional SBC 100 (see FIG. 1). In this exemplary mode of operation, the incoming SIP message profiler 102 executes a specified SIP message profiler rule to concatenate one or more predetermined digits to the user address (e.g., the phone number) of the source endpoint device 208, and to concatenate one or more predetermined digits to the user address (e.g., the phone number) of the destination endpoint device 210.

Figure 4:
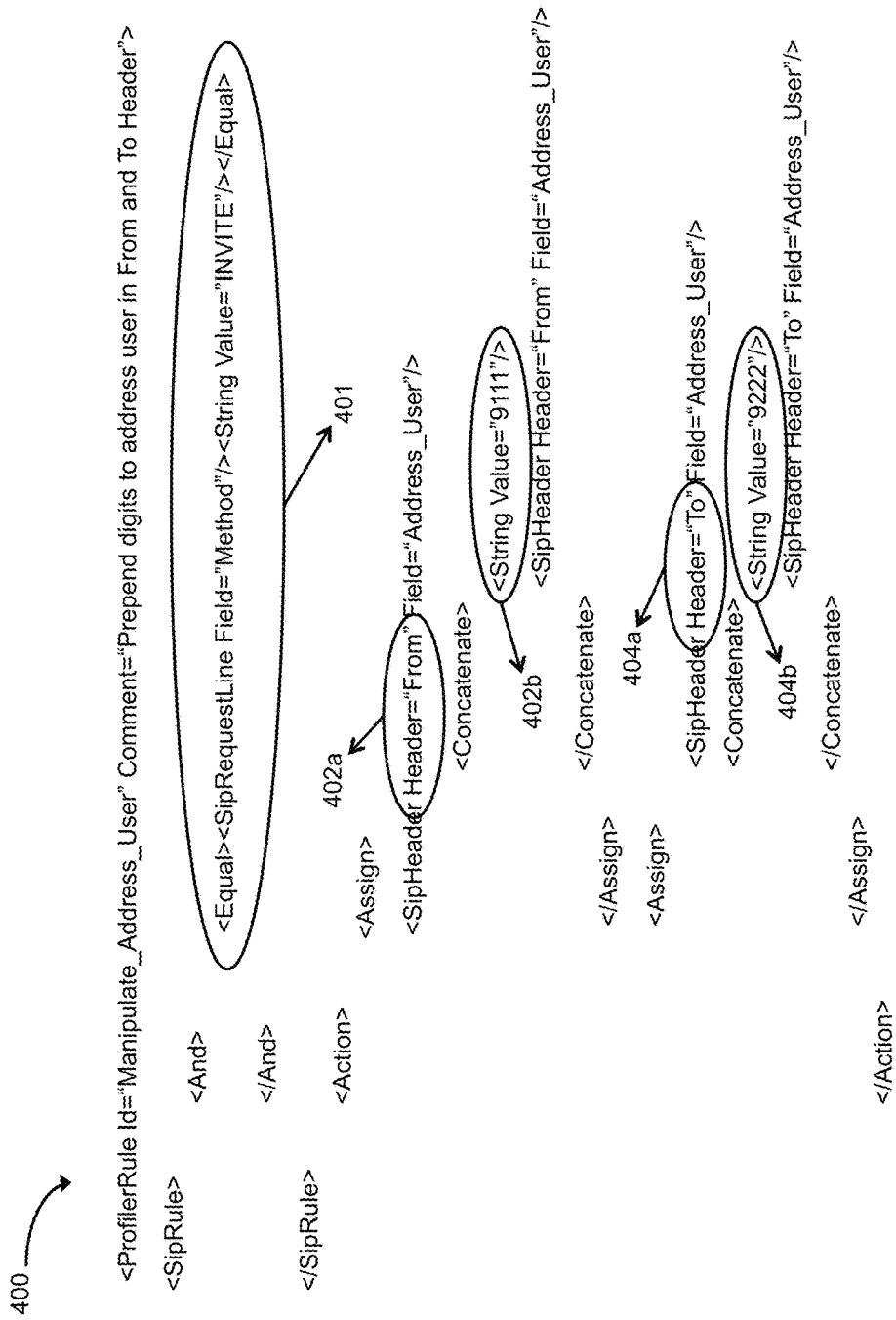
FIG. 4 illustrates an exemplary SIP message profiler rule that can be executed by an exemplary incoming or outgoing SIP message profiler included in the SBC deployed in the network environment of FIG. 2.

FIG. 4 depicts an exemplary SIP message profiler rule 400 that can be executed by the incoming SIP message profiler 102 (or the outgoing SIP message profiler 104) within the conventional SBC 100 of FIG. 1. Upon execution of the SIP message profiler rule 400, the incoming SIP message profiler 102 determines that the received SIP request message is the SIP INVITE message 300, in accordance with the following line from the SIP message profiler rule 400:

<Equal><SipRequestLine Field="Method"/><String Value="INVITE"/></Equal>, (see reference numeral 401). Having determined that the SIP request message is the SIP INVITE message 300, the incoming SIP message profiler 102 concatenates the digits "9111" (i.e., <String Value="9111"/>; see reference numeral 402b) to the user address (e.g., the phone number) of the source endpoint device 208 in the "From" header field (i.e., Header="From"; see reference numeral 402a) of the SIP INVITE message 300. In addition, the incoming SIP message profiler 202 concatenates the digits "9222" (i.e., <String Value="9222"/>; see reference numeral 404b) to the user address (e.g., the phone number) of the destination endpoint device 210 in the "To" header field (i.e., Header="To"; see reference numeral 404a) of the SIP INVITE message 300.

With reference to this exemplary mode of operation, the incoming SIP message profiler 102 (see FIG. 1) forwards the SIP INVITE message 300 (see FIG. 3) to the SCC 106 (see FIG. 1), which accesses at least some of the routing information 306 (see FIG. 3) contained in the SIP INVITE message 300, and provides the routing information to the policy engine 108 (see FIG. 1). Based at least on the routing information provided to it by the SCC 106, the policy engine 108 implements a predetermined policy for routing the SIP INVITE message 300 to the destination endpoint device 210 coupled to the IP network 206.

FIG. 5 depicts an exemplary policy 500 that can be implemented by the policy engine 108 (see FIG. 1) within the conventional SBC 100 (see FIG. 1). In this exemplary mode of operation, the routing information provided to the policy engine 108 by the SCC 106 includes parameter information, specifically, CallingPartyUserId (see reference numeral 502), which corresponds to the user address (e.g., the phone number) of the source endpoint device 208 (see FIG. 2). Having received the parameter information, CallingPartyUserId (see reference numeral 502), from the SCC 106, the policy engine 108 implements the policy 500, which calls for a specific routing treatment for the SIP INVITE message 300 based on the "CallingPartyUserId" of the source endpoint device 208. As shown in FIG. 5, the specific routing treatment corresponds to "Treatment Id='2'" (see reference numeral 504a), which results in an action expressed as "SIP peer='21'" (see reference numeral 504b), in accordance with the policy 500.

With further reference to this exemplary mode of operation, the SCC 106 (see FIG. 1) forwards the SIP INVITE message 300 (see FIG. 3) to the outgoing SIP message profiler 104 (see FIG. 1), which subsequently sends the SIP INVITE message 300 over the IP network 206 (see FIG. 2) for ultimate receipt at the destination endpoint device 210 (see FIG. 2), using the specific routing treatment called for by the implementation of the policy 500. Because, in the conventional SBC 100 (see FIG. 1), the SIP message profiler rule(s) executed by the incoming/outgoing SIP message profilers 102, 104 (see FIG. 1), as well as the policy(ies) implemented by the policy engine 108 (see FIG. 1), have limited ability to be generated and/or modified at runtime after deployment of the SBC 100, the implementation of a new feature in such a conventional SBC typically requires a separate design and development cycle of the SBC. However, such a separate design and development cycle for implementing a feature in an SBC can delay the time-to-market, increase costs, and potentially introduce vulnerabilities and/or instabilities into the SBC.

Figure 6:
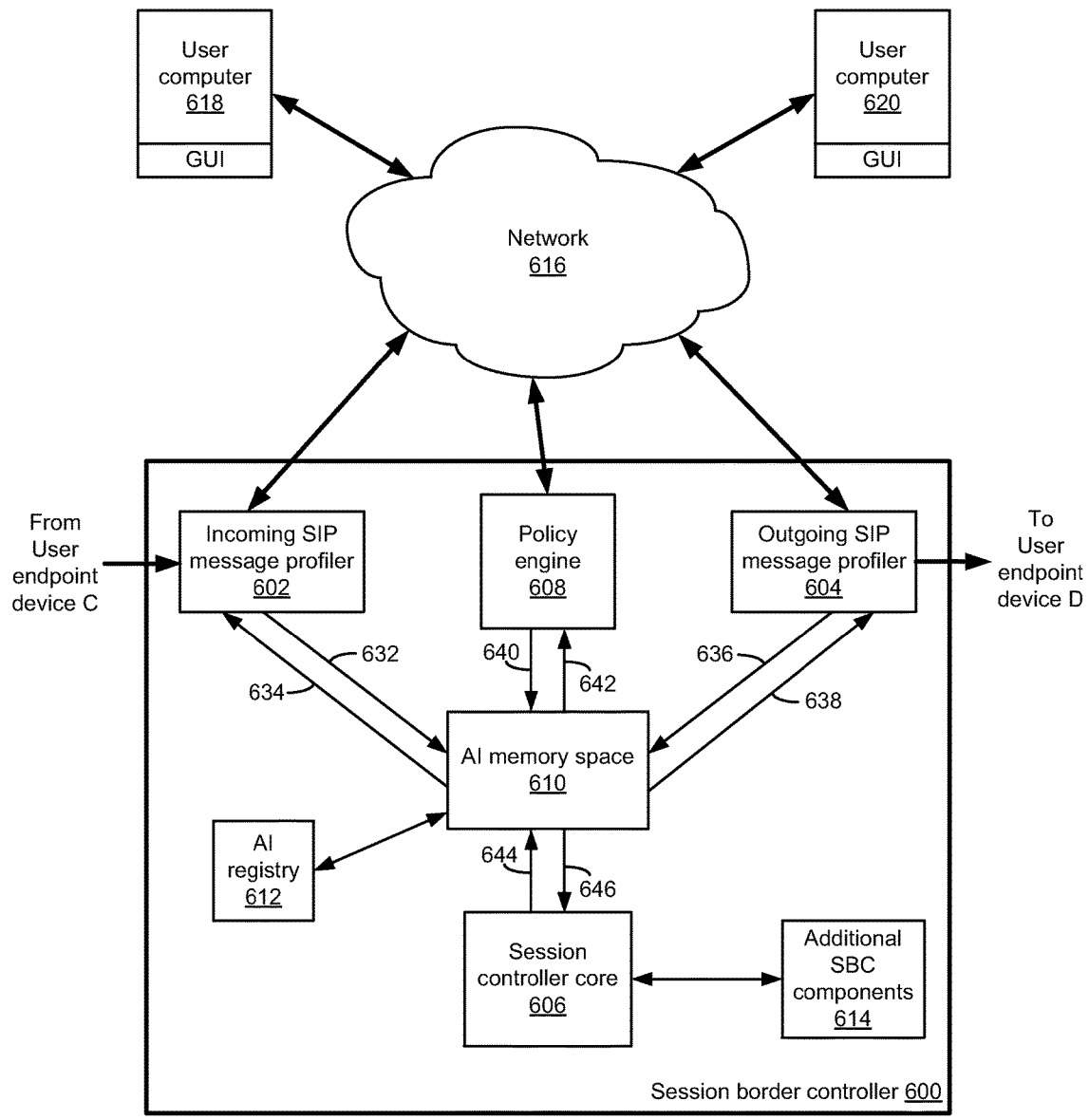
FIG. 6 is a block diagram of an exemplary SBC, in which one or more features can be implemented at runtime after deployment, in accordance with the present application.

FIG. 6 depicts an illustrative embodiment of an exemplary session border controller (SBC) 600, in which one or more features can be implemented at runtime after deployment, in accordance with the present application. As shown in FIG. 6, the SBC 600 includes a plurality of SIP message profile analyzers/manipulators, including an incoming SIP message profiler 602 and an outgoing SIP message profiler 604. The SBC 600 further includes a session controller core (SCC) 606, a policy engine 608, an actionable information memory space 610, and an actionable information registry 612. The term "actionable information" (AI) is employed herein to refer to information or data including, but not limited to, SIP header profile information, SIP parameter profile information, SIP method profile information, policy rule information, policy parameter information, and/or SBC feature information, at least some of which can be generated by one or more functional components of the SBC 600 (such information or data generated by functional components of the SBC 600 also referred to herein as "system AI"), and/or inputted or otherwise introduced into the SBC 600 by a user (such information or data introduced into the SBC 600 by a user also referred to herein as "user AI").

In the illustrative embodiment of FIG. 6, one or more user computers 618, 620 can interface with at least the incoming SIP message profiler 602, the outgoing SIP message profiler 604, and/or the policy engine 608 over at least one network 616, enabling one or more users to introduce such user AI into the SBC 600 prior to deployment, and/or at runtime after deployment. For example, the network 616 can include one or more IP networks, one or more TDM networks, and/or any other suitable network(s).

Once such user AI is introduced into the SBC 600 by the user(s), the incoming SIP message profiler 602, the outgoing SIP message profiler 604, the SCC 606, and/or the policy engine 608 can deposit (via data paths 632, 636, 644, and 640, respectively) the user AI, as well as any system AI generated by the functional components of the SBC 600, into the AI memory space 610 to allow any dynamic values associated with the user AI and/or the system AI (e.g., one or more values from one or more SIP messages, one or more values generated in response to the implementation of one or more policies, one or more values generated in response to the execution of one or more rules, etc.) to be passed (via data paths 634, 638, 646, and 642, respectively), as desired and/or required, between the incoming SIP message profiler 602, the outgoing SIP message profiler 604, the SCC 606, and/or the policy engine 608. The user AI and the system AI can also be deposited, via the AI memory space 610, into the AI registry 612 for subsequent registration and storage in one or more AI registry files, or any other suitable data store. Moreover, the SCC 606 can pass selected user AI and/or system AI to one or more additional SBC components 614 for billing purposes, and/or any other suitable purpose(s).

FIG. 7 depicts exemplary actionable information (AI) 700 (e.g., user AI or system AI), which can be stored in the AI registry 612 included in the SBC 600 (see FIG. 6). As shown in FIG. 7, the AI 700 can contain information pertaining to at least one targeted consumer ("Consumer") of the AI (e.g., a session controller core ("Core"), a policy engine ("Policy"), a SIP message profiler ("Profiler"), or "Any"), at least one command ("Command") that can be executed using the AI (e.g., invoke a policy ("InvokePolicy"), forward a SIP request/response message ("Forward"), reject a SIP request/response message ("Reject"), "UseCNAME", "UseDestination", "RecordInfo"), and one or more parameters ("Parameters") that can be passed using the AI (e.g., "Value(Policy Name/CNAME(String))", "Response Code", "Boolean Y/N", "Name-Value Pairs"). In one embodiment, the AI 700 can have the following general format:

AI_Name{Consumer, Command, Parameter(s)},
for example,
AI_UseDestination {Any, UseDestintation, NVPairs {"Peer=X; Intf=Y"},
AI_InvokePolicy {Any, InvokePolicy, Value{String}}, and
AI_RecordInfo {Core, RecordInfo, Value {String}}.

The operation of the SBC 600 of FIG. 6 will be further understood with reference to the following illustrative example. In this example, a user introduces, via an external user computer (e.g., the user computer 618 or 620; see FIG. 6), user AI into the SBC 600 prior to deployment. For example, such user AI can include policy rule information and/or policy parameter information, introduced into the SBC 600 via the policy engine 608, pertaining to a predetermined policy to be implemented by the policy engine 608. Such user AI can further include SIP header profile information introduced into the SBC 600, via the incoming and/or outgoing SIP message profiler 602, 604, for manipulating, in a specified SIP message profiler rule, an outgoing SIP message profile in accordance with the predetermined policy, as well as SBC feature information introduced into the SBC 600, via the incoming and/or outgoing SIP message profiler 602, 604, for marking a session with a predetermined feature tag in response to the execution of the specified SIP message profiler rule. The policy engine 608 and the incoming/outgoing SIP message profiler 602, 604 each deposit (via the data paths 640, 632, and 636, respectively) such user AI, including the policy rule information, the policy parameter information, the SIP header profile information, and/or the SBC feature information, into the AI memory space 610 for subsequent deposit, registration, and storage in the AI registry 612 in one or more AI registry files. Further, the SCC 606 implements a predetermined AI lookup policy in the AI registry files for subsequent use by the user in accessing the user AI, as well as any system AI, from the AI registry 612.

In this illustrative example, the SBC 600 is deployed at a border between VoIP networks for controlling interactive multimedia communications sessions between parties of VoIP calls. At runtime after deployment, the user interfaces, over the network 616 via a graphical user interface (GUI) of the user computer 618 or 620, with the incoming SIP message profiler 602, the outgoing SIP message profiler 604, and/or the policy engine 608 to access the user AI and/or the system AI stored in the AI registry 612. Further, the SBC 600 exposes or otherwise makes available, to the user via the GUI of the user computer 618 or 620, the user AI and/or the system AI stored in the AI registry 612 in accordance with the AI lookup policy. For example, the SBC 600 can expose the user AI and/or the system AI to the user via the incoming SIP message profiler 602, the outgoing SIP message profiler 604, and/or the policy engine 608 (via the data paths 634, 638, and/or 642, respectively). Moreover, the user accesses, via the GUI of the user computer 618 or 620, a first portion of the user AI, such as the policy rule information and/or the policy parameter information pertaining to the predetermined policy to be implemented by the policy engine 608, and modifies, via the GUI of the user computer 618 or 620, the predetermined policy using the policy rule and/or parameter information.

FIG. 8 illustrates an exemplary policy 800 that can be implemented by the policy engine 608 (see FIG. 6) included in the SBC 600 (see FIG. 6), in which the policy 800 is modified by the user using the first portion of the user AI, namely, the policy rule information and/or the policy parameter information pertaining to the policy 800. For example, the user may modify the policy 800 to provide a specific routing treatment for a specified route in a VoIP call, such that the specific routing treatment introduces a new feature in the SBC for handling the VoIP call.

In this illustrative example, the policy 800 (see FIG. 8) corresponds to a modified version of the policy 500 (see FIG. 5). Like the policy 500, the policy 800 operates on parameter information, specifically, CallingPartyUserId (see reference numeral 802), which, in this illustrative example, corresponds to the user address (e.g., the phone number) of a user endpoint device C, e.g., the user endpoint device 209 (e.g., a VoIP-enabled phone) (also referred to herein as a/the "source endpoint device"). However, while the policy 500 calls for the specific routing treatment corresponding to "Treatment Id='2'" (see reference numeral 504*a*) based on the "CallingPartyUserId", resulting in the action expressed as "SIP peer='21'" (see reference numeral 504*b*), the policy 800 has been modified, by the user using the user AI, to call for a specific routing treatment corresponding to "Treatment Id='3'" (see reference numeral 804*a*) based on the "CallingPartyUserId", resulting in a different action expressed as follows:

<AI_MarkedPriority Value="High">
   <Peer><SIP peer="22"/></Peer>
</AI_Marked Priority>, (see reference numeral 804*b*).

In addition, the user accesses, via the GUI of the user computer 618 or 620, a second portion of the user AI, such as the SIP header profile information and/or the SBC feature information pertaining to the specified SIP message profiler rule to be executed by the incoming or outgoing SIP message profiler 602, 604, and modifies, via the GUI of the user computer 618 or 620, the specified SIP message profiler rule using the SIP header profile and/or SBC feature information.

Figure 9:
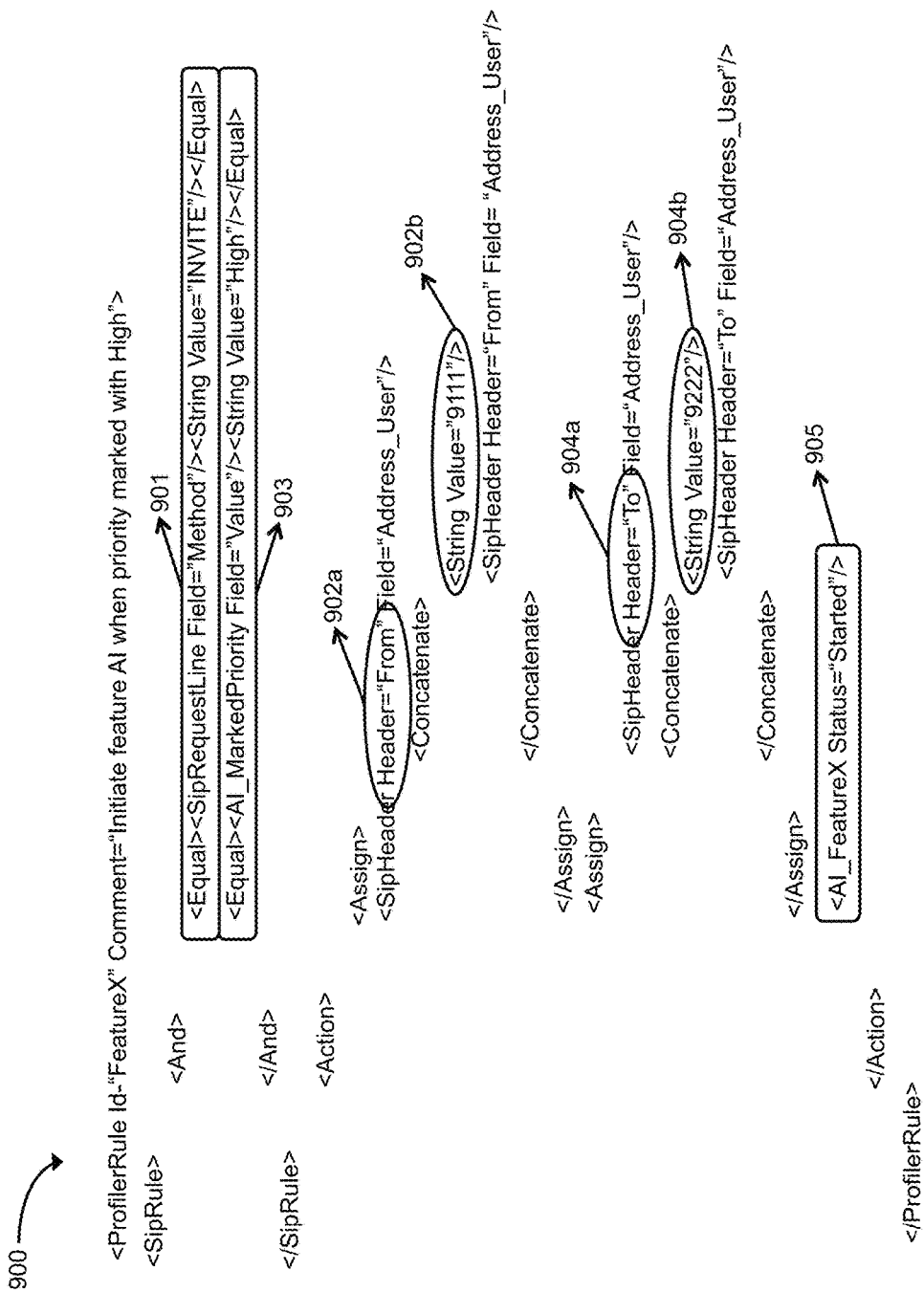
FIG. 9 illustrates an exemplary SIP message profiler rule that can be executed by an exemplary SIP message profiler included in the SBC of FIG. 6, the SIP message profiler rule being able to be generated or modified by a user using at least some of the AI of FIG. 7.

FIG. 9 illustrates an exemplary SIP message profiler rule 900 that can be executed by the incoming or outgoing SIP message profiler 602, 604 (see FIG. 6) included in the SBC 600 (see FIG. 6), in which the SIP message profiler rule is modified by the user using the second portion of the user AI, specifically, the SIP header profile information and/or the SBC feature information pertaining to the SIP message profiler rule 900.

In this illustrative example, the SIP message profiler rule 900 corresponds to a modified version of the SIP message profiler rule 400 (see FIG. 4). Like the SIP message profiler rule 400, the SIP message profiler rule 900 can be used, upon its execution, to determine that a received SIP request message is the SIP INVITE message, in accordance with the following line from the SIP message profiler rule 900:

<Equal><SipRequestLine Field="Method"/><String Value="INVITE"/></Equal>, (see reference numeral 901). In addition, having determined that the SIP request message is the SIP INVITE message, the SIP message profiler rule 900 can be used, upon its further execution, to concatenate the digits "9111" (i.e., <String Value="9111"/>; see reference numeral 902*b*) to the user address (e.g., the phone number) of the source endpoint device 209 in the "From" header field (i.e., Header="From"; see reference numeral 902*a*) of the SIP INVITE message, and to concatenate the digits "9222" (i.e., <String Value="9222"/>; see reference numeral 904*b*) to the user address (e.g., the phone number) of a user endpoint device D, e.g., the user endpoint device 211 (e.g., an additional VoIP-enabled phone) (also referred to herein as a/the "destination endpoint device") in the "To" header field (i.e., Header="To"; see reference numeral 904*a*) of the SIP INVITE message.

However, while the SIP message profiler rule 400 specifies no further action(s) subsequent to the concatenation of the digits "9111" and "9222" to the user addresses of the source endpoint device 209 and the destination endpoint device 211, respectively, the SIP message profiler rule 900 has been modified, by the user using the user AI, to determine, upon its execution, that a priority value for a specified route in the VoIP call has been set to a logical high level, in accordance with the following line from the SIP message profiler rule 900:

<Equal><AI_MarkedPriority Field="Value"/><String Value="High"/></Equal>, (see reference numeral 903). The SIP message profiler rule 900 has also been modified, by the user using the user AI, to mark a session with a predetermined feature tag in response to its further execution, in accordance with the following additional line from the SIP message profiler rule 900:

<AI_FeatureX Status="Started"/>, (see reference numeral 905).

With reference to this illustrative example, a first party to a VoIP call sends, from the source endpoint device 209 within the IP network 204 (see FIG. 2), a SIP request message for ultimate receipt, at the destination endpoint device 211 within the IP network 206, by a second party to the VoIP call. For example, the SIP request message can be a SIP INVITE message for inviting the second party to participate in a session for the VoIP call, or any other suitable SIP request message. The SIP INVITE message is received by the SBC 600, and forwarded by the incoming SIP message profiler 602 to the SCC 606, which accesses at least routing information contained in the SIP INVITE message. In this illustrative example, the routing information accessed by the SCC 606 includes the parameter information, CallingPartyUserId (see reference numeral 802), which corresponds to the user address (e.g., the phone number) of the source endpoint device 209 (see FIG. 2). The parameter information, CallingPartyUserId (see reference numeral 802), is indicative of the specified route in the VoIP call that is subject to specific routing treatment (i.e., Treatment Id="3") by the policy 800 (see FIG. 8), such that the specific routing treatment introduces the new feature in the SBC for the handling of the VoIP call.

The SCC 606 (see FIG. 6) provides at least the routing information (i.e., CallingPartyUserId) to the policy engine 608 (see FIG. 6), which implements the policy 800 (see FIG. 8) based on the specified route indicated in the routing information. Specifically, in response to the implementation of the policy 800, a priority value for the specified route is set to a logical high level (i.e., AI_MarkedPriority Value="High"; see reference numeral 804*b*). The SCC 606 then forwards the SIP INVITE message to the outgoing SIP message profiler 604 (see FIG. 6), which executes the SIP message profiler rule 900 (see FIG. 9) based on the setting of the priority value for the specified route. In response to the execution of the SIP message profiler rule 900, the outgoing SIP message profiler 604 manipulates the SIP INVITE message to mark the session for the VoIP call with the predetermined feature tag indicative of the specific routing treatment, which introduces the new feature in the SBC for the handling of the VoIP call (i.e., AI_FeatureX Status="Started"/; see reference numeral 905). For example, the outgoing SIP message profiler 604 may add a suitable SIP priority header to the SIP INVITE message. The outgoing SIP message profiler 604 then sends the SIP INVITE message with the SIP priority header over the IP network 106 for receipt at the destination endpoint device 211 by the second party to the VoIP call.

Figure 10:
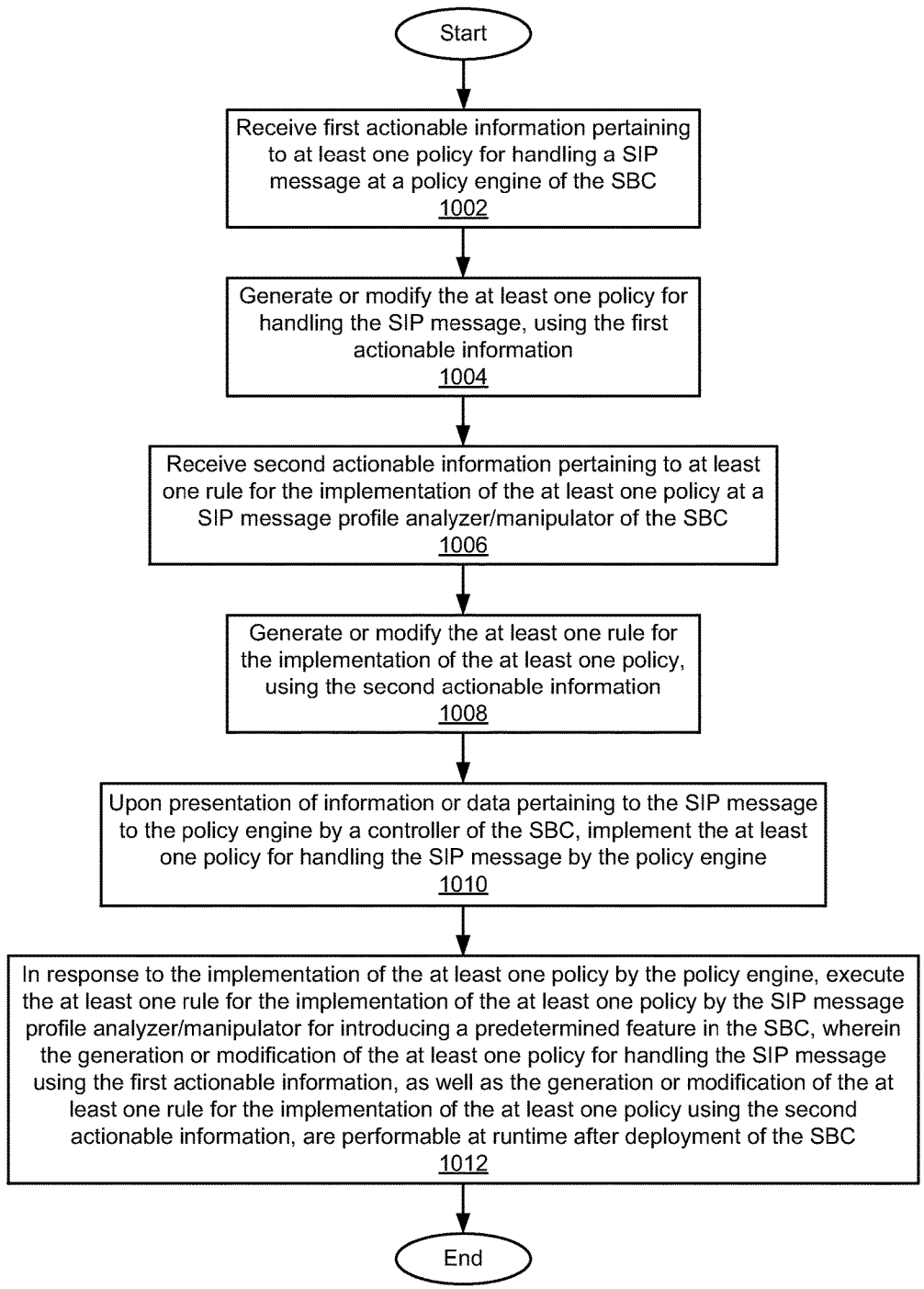
FIG. 10 is a flow diagram of an exemplary method of implementing a feature in the SBC of FIG. 6 at runtime after deployment, using the policy of FIG. 8 and the SIP message profiler rule of FIG. 9.

An exemplary method of implementing a feature in an SBC, at runtime after deployment, is described herein with reference to FIG. 10. In this exemplary method, such an SBC can be embodied as the SBC 600 of FIG. 6. As depicted in block 1002, first actionable information pertaining to at least one policy for handling a SIP message is received at a policy engine of the SBC. As depicted in block 1004, the at least one policy for handling the SIP message is generated or modified, using the first actionable information. As depicted in block 1006, second actionable information pertaining to at least one rule for the implementation of the at least one policy is received at a SIP message profile analyzer/manipulator of the SBC. As depicted in block 1008, the at least one rule for the implementation of the at least one policy is generated or modified, using the second actionable information. As depicted in block 1010, upon presentation of information or data pertaining to the SIP message to the policy engine by a controller of the SBC, the at least one policy for handling the SIP message is implemented by the policy engine. As depicted in block 1012, in response to the implementation of the at least one policy by the policy engine, the at least one rule for the implementation of the at least one policy is executed by the SIP message profile analyzer/manipulator for introducing a predetermined feature in the SBC, wherein the generation or modification of the at least one policy for handling the SIP message using the first actionable information, as well as the generation or modification of the at least one rule for the implementation of the at least one policy using the second actionable information, are performable at runtime after deployment of the SBC.

It will be appreciated by those of ordinary skill in the art that one or more of the functions necessary to implement the systems and methods described herein can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, wire-based, optical fiber-based, or wireless communications media or devices, and/or any other suitable hardware and/or software components and/or devices. Further, such functions for implementing the systems and methods described herein can be employed in session border controllers, session security gateways, media gateways, or any other suitable hardware and/or software implementations of telecommunications equipment, nodes, components, or collections of functions.

It will be further appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A session border controller, the session border controller communicably connected to at least one external user computer at runtime after deployment, the at least one external user computer including a graphical user interface (GUI), the session border controller comprising:
    a message profiler processor;
    a policy engine processor,
    wherein each of the message profiler processor and the policy engine processor is configured to influence at least one operational aspect of the session border controller for handling communications data;
    a session controller core processor configured to provide at least a portion of the communications data to one or more of the message profiler processor and the policy engine processor for influencing the at least one operational aspect of the session border controller; and
    a data storage storing actionable information, the actionable information defines how the at least one operational aspect of the session border controller is influenced by one or more of the message profiler processor and the policy engine processor, the actionable information including first actionable information pertaining to at least one profiler rule, and second actionable information pertaining to at least one policy defining a specific routing treatment for a specified route for the communications data, the specified route having a priority value associated therewith,
    wherein, at runtime after the deployment of the session border controller:
        the message profiler processor is configured to:
            interface with the at least one external user computer;
            receive, from the data storage, the first actionable information pertaining to the at least one profiler rule; and
            perform one of generating and modifying, at the runtime by at least one user via the GUI of the at least one external user computer, the at least one profiler rule based on the first actionable information; and
        the policy engine processor is configured to:
            interface with the at least one external user computer;
            receive, from the data storage, the second actionable information pertaining to the at least one policy;
            modify, at the runtime by the at least one user via the GUI of the at least one external user computer, the at least one policy based on the second actionable information;
            set the priority value for the specified route to a predetermined level based on the at least one modified policy; and
            provide the specific routing treatment for the specified route for the communications data based on the priority value.

2. The session border controller of claim 1 wherein one or more of the message profiler processor and the policy engine processor are configured to influence the at least one operational aspect of the session border controller for handling communications data by being further configured:
    to implement the at least one modified policy for handling the communications data; and
    to execute the at least one profiler rule pertaining to an implementation of the at least one modified policy based at least on the priority value for the specified route.

3. The session border controller of claim 2 wherein the message profiler processor is a session initiation protocol (SIP) message profiler processor, and wherein one or more of the SIP message profiler processor and the policy engine processor are further configured to implement the at least one modified policy for handling the communications data formatted as one or more SIP messages.

4. The session border controller of claim 3 wherein the actionable information stored in the data storage further includes (i) one or more of SIP header profile information, SIP parameter profile information, and SIP method profile information, (ii) one or more of policy rule information and policy parameter information, and (iii) feature information pertaining to at least a predetermined feature of the session border controller.

5. The session border controller of claim 2 wherein one or more of the message profiler processor, the policy engine processor, and the session controller core processor are further configured, at runtime after the deployment of the session border controller, to generate the actionable information storable in the data storage.

6. The session border controller of claim 2 wherein the actionable information storable in the data storage is introduced into the session border controller by the at least one external user computer after the deployment of the session border controller.

7. The session border controller of claim 2 wherein the data storage is further configured to register the actionable information for subsequent storage therein.

8. The session border controller of claim 2 wherein each of the message profiler processor and the policy engine processor is further configured, at runtime after the deployment of the session border controller, to interface with the at least one external user computer for accessing and modifying, by the at least one user via the GUI of the at least one external user computer, the actionable information stored in the data storage in accordance with a predetermined lookup policy.

9. The session border controller of claim 1 wherein the policy engine processor is further configured to implement the at least one modified policy for routing the communication data on the specified route, and wherein the message profiler processor is further configured to execute the at least one modified profiler rule based on the specified route for the communication data.

10. A method of operating a session border controller at runtime after deployment on a network, the session border controller communicably connected to a first endpoint device, a second endpoint device, and an external user computer over the network, the external user computer including a graphical user interface (GUI), the method comprising:
    storing, in a data storage of the session border controller, actionable information, the actionable information defines how at least one operational aspect of the session border controller for handling communications data is influenced by at least an incoming message profiler processor, an outgoing message profiler processor, and a policy engine processor of the session border controller, the actionable information including first actionable information pertaining to at least one profiler rule, and second actionable information pertaining to at least one policy defining a specific routing treatment for a specified route for a message received over the network, the specified route having a priority value associated therewith;
    at runtime after the deployment of the session border controller on the network:
        receiving, at the incoming message profiler processor, the message over the network from the first endpoint device;
        interfacing, by one or more of the incoming message profiler processor and the outgoing message profiler processor, at the runtime with the external user computer;
        receiving, by the one or more of the incoming message profiler processor and the outgoing message profiler processor, the first actionable information pertaining to the at least one profiler rule; and
        performing one of generating and modifying, via the GUI of the external user computer, the at least one profiler rule based on the first actionable information;
        interfacing, by the policy engine processor, at the runtime with the external user computer;
        receiving, by the policy engine processor, the second actionable information pertaining to the at least one policy;
        modifying, via the GUI of the external user computer, the at least one policy based on the second actionable information;
        setting the priority value for the specified route to a predetermined level based on the at least one modified policy; and
        providing the specific routing treatment for the specified route for the message based on the priority value; and
    once at least the at least one policy for handling the received message is modified by the user of the external user computer:
        executing, by the policy engine processor, the at least one modified policy; and
        manipulating, by the outgoing message profiler processor, the message in accordance with the at least one modified policy; and
        sending, by the outgoing message profiler processor, the manipulated message over the network to the second endpoint device.

11. The method of claim 10 wherein the manipulating of the message includes manipulating the message in accordance with the at least one modified policy, the message being formatted as a session initiation protocol (SIP) message.

12. The method of claim 11 wherein the actionable information further includes (i) one or more of SIP header profile information, SIP parameter profile information, and SIP method profile information, (ii) one or more of policy rule information and policy parameter information, and (iii) feature information pertaining to at least one predetermined feature of the session border controller, and wherein the storing of the actionable information includes storing one or more of the SIP header profile information, the SIP parameter profile information, the SIP method profile information, the policy rule information, the policy parameter information, and the feature information pertaining to at least one predetermined feature of the session border controller.

13. The method of claim 10 further comprising:
    generating, at runtime after the deployment of the session border controller, the actionable information storable in the data storage by one or more of the incoming message profiler processor, the outgoing message profiler processor, and the policy engine processor.

14. The method of claim 10 further comprising:
    receiving, from the external user computer at runtime after the deployment of the session border controller, the actionable information storable in the data storage.

15. The method of claim 10 further comprising:
    registering, by the data storage, the actionable information for subsequent storage in the data storage.

16. The method of claim 10 wherein the receiving of the first actionable information pertaining to the at least one profiler rule includes accessing the at least one profiler rule stored in the data storage in accordance with a predetermined lookup policy, and wherein the receiving of the second actionable information pertaining to the at least one policy includes accessing the at least one policy stored in the data storage in accordance with the predetermined lookup policy.

17. The method of claim 10 further comprising:
    at the runtime after the deployment of the session border controller on the network, defining, via the GUI of the external user computer, at least the at least one modified policy for implementing the specific routing treatment for the message based at least on the second actionable information.

18. A session border controller, comprising:
    a policy engine processor configured to receive, at runtime after deployment of the session border controller, at least one policy for handling a session initiation protocol (SIP) message;
    a SIP message profiler processor configured to receive, at runtime after the deployment of the session border controller, at least one SIP profiler rule pertaining to execution of the at least one policy for handing the SIP message;
    a data storage storing actionable information, the actionable information including first actionable information pertaining to the at least one policy received at the policy engine, and second actionable information pertaining to the at least one SIP profiler rule received at the SIP message profiler, the at least one policy defining a specific routing treatment for a specified route for the SIP message, the specified route having a priority value associated therewith; and a session controller core processor configured to present at least a portion of the SIP message to the policy engine processor for subsequent control of the handling thereof based at least on the at least one policy, and to forward the SIP message to the SIP message profiler processor for subsequent manipulation of at least a portion thereof in response to the execution of the at least one policy, wherein, at runtime after the deployment of the session border controller:

the policy engine processor is further configured to:
interface with at least one external user computer;
receive, from the data storage, the first actionable information pertaining to the at least one policy;
modify, at the runtime by at least one user via a graphical user interface (GUI) of the at least one external user computer, the at least one policy based on the first actionable information;
set the priority value for the specified route to a predetermined level based on the at least one modified policy; and
provide the specific routing treatment for the specified route for the SIP message based on the priority value; and the SIP message profiler processor is further configured to:
interface with the at least one external user computer; and
perform one of generating and modifying, at the runtime by the at least one user via the GUI of the at least one external user computer, the at least one SIP profiler rule based on the second actionable information.

19. The session border controller of claim 18 wherein the actionable information further includes (i) one or more of SIP header profile information, SIP parameter profile information, and SIP method profile information, (ii) one or more of policy rule information and policy parameter information, and (iii) feature information pertaining to at least the predetermined feature of the session border controller.

20. The session border controller of claim 18 wherein the SIP message profiler processor is further configured to add a SIP priority header to the SIP message for implementing the predetermined feature of the session border controller.

21. A session border controller communicably connected to a first endpoint device, a second endpoint device, and an external computer over a network, the external computer including a graphical user interface (GUI), the session border controller comprising:

an incoming message profiler processor;
an outgoing message profiler processor;
a policy engine processor,
wherein each of the incoming message profiler processor, the outgoing message profiler processor, and the policy engine processor is configured to influence one or more operational aspects of the session border controller for handling one or more messages exchanged between the first endpoint device and the second endpoint device; and a data storage storing actionable information, the actionable information defines how the one or more operational aspects of the session border controller are influenced by one or more of the incoming message profiler processor, the outgoing message profiler processor, and the policy engine processor, the actionable information including first actionable information pertaining to at least one profiler rule, and second actionable information pertaining to at least one policy defining a specific routing treatment for a specified route for a message received over the network, the specified route having a priority value associated therewith, wherein, at runtime after a deployment of the session border controller on the network:

the incoming message profiler processor is configured to receive the message over the network from the first endpoint device;

one or more of the incoming message profiler processor and the outgoing message profiler processor are configured to:
interface with the external computer;
receive, from the data storage, the first actionable information pertaining to the at least one profiler rule; and
perform one of generating and modifying, at the runtime by a user via the GUI of the external computer, the at least one profiler rule based on the first actionable information;

the policy engine processor is configured to:
interface with the external computer;
modify, at the runtime by the user via the GUI of the external computer, the at least one policy based on the second actionable information;
set the priority value for the specified route to a predetermined level based on the at least one modified policy; and
provide the specific routing treatment for the specified route for the message based on the priority value, and the outgoing message profiler processor is configured, once at least the at least one policy is modified by the user of the external computer, to execute the at least one modified policy, to manipulate the message in accordance with the at least one modified policy, and to send the manipulated message over the network to the second endpoint device.

22. The session border controller of claim 21 wherein the actionable information further includes (i) one or more of header profile information, parameter profile information, and method profile information, (ii) one or more of policy rule information and policy parameter information, and (iii) feature information pertaining to at least one feature of the session border controller.

23. The session border controller of claim 22 wherein one or more of the incoming message profiler processor and the outgoing message profiler processor are further configured to interface with the external computer, and perform one of generating and modifying, by the user via the GUI of the external computer, one or more of the header profile information, the parameter profile information, the method profile information, and the feature information, and wherein the policy engine processor is further configured to interface with the external computer, and modify, by the user via the GUI of the external computer, one or more of the policy rule information and the policy parameter information.

24. A session border controller communicably connected to at least one user computer in a telecommunications network, the at least one user computer including a graphical user interface (GUI), the session border controller comprising:

a message profiler processor;
a policy engine processor;

a session controller core processor configured to provide communications data to one or more of the message profiler processor and the policy engine processor; and a data storage storing actionable information, the actionable information including first actionable information pertaining to at least one profiler rule, and second actionable information pertaining to at least one policy defining a specific routing treatment for a specified route for the communications data, the specified route having a priority value associated therewith, wherein, at runtime after a deployment of the session border controller in the telecommunications network:

the policy engine processor is configured to:

interface with the at least one user computer over the telecommunications network;

receive, from the data storage, the first actionable information pertaining to the at least one policy;

modify, at the runtime by at least one user via the GUI of the at least one user computer, the at least one policy based on the first actionable information;

set the priority value for the specified route to a predetermined level based on the at least one modified policy;

provide the specific routing treatment for the specified route for the communications data based on the priority value; and implement the at least one modified policy for routing the communication data on the specified route; and the message profiler processor is configured to:

interface with the at least one user computer over the telecommunications network;

perform one of generating and modifying, at the runtime by the at least one user via the GUI of the at least one user computer, the at least one profiler rule based on the first actionable information; and execute the at least one modified profiler rule based on the specified route for the communication data.

\* \* \* \* \*